(12) United States Patent
Miah et al.

(10) Patent No.: US 12,323,525 B2
(45) Date of Patent: Jun. 3, 2025

(54) METHOD AND SYSTEM FOR FACILITATING AUTHENTICATION OF REMOTE TERMINALS

(71) Applicant: JPMorgan Chase Bank, N.A., New York, NY (US)

(72) Inventors: Mizan Miah, Wilmington, DE (US); Sobana Thirunavukkarasu, Plano, TX (US); Carlos Romero, Fort Myers Beach, FL (US); Ryan S Yoder, Tampa, FL (US); Gopinath Kondapally, Phoenix, AZ (US); Julio C Mecias Hurtado, Temple Terrace, FL (US); Xueming Yin, Suwanee, GA (US); Peter Andrew Aguas, Las Pinas (PH); Serafin Fuente, Alpharetta, GA (US); Jared Bench, Saint Petersburg, FL (US); Pranil Maharjan, Little Elm, TX (US); Bruce N Ashby, Tampa, FL (US); Joel Fajilan, Bulacan (PH); Robert Lopez, Gulfport, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 74 days.

(21) Appl. No.: 18/134,204

(22) Filed: Apr. 13, 2023

(65) Prior Publication Data
US 2024/0348443 A1 Oct. 17, 2024

(51) Int. Cl.
*H04L 9/32* (2006.01)
*H04L 9/30* (2006.01)

(52) U.S. Cl.
CPC .......... *H04L 9/3213* (2013.01); *H04L 9/3073* (2013.01)

(58) Field of Classification Search
CPC ............................ H04L 9/3213; H04L 9/3073
See application file for complete search history.

(56) References Cited

U.S. PATENT DOCUMENTS

2002/0026511 A1* 2/2002 Garcia-Luna-Aceves ................... H04L 61/4553 711/E12.096
2002/0133707 A1* 9/2002 Newcombe ........... H04L 69/329 713/189

(Continued)

*Primary Examiner* — Abu S Sholeman
(74) *Attorney, Agent, or Firm* — Greenblum & Bernstein, P.L.C.

(57) ABSTRACT

A method for facilitating automated authentication of a plurality of remote terminals is disclosed. The method includes generating, via a remote terminal, a key pair, the key pair including a public key and a private key that is persisted within the remote terminal; generating, via the remote terminal, a communication request by using the key pair, the communication request including the public key; transmitting, via the remote terminal using an application programming interface, the communication request to a terminal management server; registering, via the terminal management server, the remote terminal to a terminal database by using information in the communication request; persisting, via the terminal management server, the public key from the communication request to a persistent object storage repository; and generating, via the terminal management server, a response to the communication request, the response including status information and configuration information.

18 Claims, 4 Drawing Sheets

(56) References Cited

U.S. PATENT DOCUMENTS

| | | | |
|---|---|---|---|
| 2005/0201363 A1* | 9/2005 | Gilchrist | H04L 51/212 |
| | | | 370/352 |
| 2007/0098175 A1* | 5/2007 | Jakubiec | H04L 9/0891 |
| | | | 380/277 |
| 2017/0142129 A1* | 5/2017 | Peng | H04L 63/061 |
| 2020/0244467 A1* | 7/2020 | Thambundit, IV | H04L 9/3268 |

* cited by examiner

METHOD AND SYSTEM FOR FACILITATING AUTHENTICATION OF REMOTE TERMINALS

BACKGROUND

1. Field of the Disclosure

This technology generally relates to methods and systems for remote terminal authentication, and more particularly to methods and systems for facilitating automated authentication of electronic communications between remote terminals and terminal management servers.

2. Background Information

Many business entities deploy numerous remote terminals such as, for example, point-of-sale terminals to facilitate business operations and to provide services for users. Often, the business entities rely on automated electronic communications such as, for example, heartbeat calls between software agents on the remote terminals and terminal management servers to monitor and track the health of the remote terminals. Historically, implementations of conventional authentication protocols for the automated electronic communications have resulted in varying degrees of success with respect to preventing hijack and/or theft of data through the remote terminals as well as ensuring that the remote terminals are validated by the terminal management servers.

One drawback of using the conventional authentication protocols is that in many instances, registration of the remote terminals and maintenance actions such as, for example, protected key rotations require user intervention. As such, operating configurations of the remote terminals and security of the automated electronic communications vary amongst the numerous remote terminals. Additionally, due to reliance on multiple keys, the conventional authentication protocols are resource intensive for tasks such as, for example facilitating downloads and uploads by the remote terminals as well as resetting expired keys.

Therefore, there is a need to facilitate automated authentication of electronic communications between remote terminals and terminal management servers by employing unique terminal signatures, strong and secure cryptographic key initialization, touchless terminal public key registration, automatic and protected key rotation, easy reset of expired keys, single key protection for all communications, as well as use of industry standard web tokens such as, for example, JAVA Web Tokens as envelope to carry and secure data.

SUMMARY

The present disclosure, through one or more of its various aspects, embodiments, and/or specific features or sub-components, provides, inter alia, various systems, servers, devices, methods, media, programs, and platforms for facilitating automated authentication of electronic communications between remote terminals and terminal management servers.

According to an aspect of the present disclosure, a method for facilitating automated authentication of a plurality of remote terminals is disclosed. The method is implemented by at least one processor. The method may include generating, via a remote terminal, at least one key pair, the at least one key pair may include a public key and a private key that is persisted within the remote terminal; generating, via the remote terminal, at least one communication request by using the at least one key pair, the at least one communication request may include the public key; transmitting, via the remote terminal using an application programming interface, the at least one communication request to a terminal management server; registering, via the terminal management server, the remote terminal to a terminal database by using information in the at least one communication request; persisting, via the terminal management server, the public key from the at least one communication request to a persistent object storage repository; and generating, via the terminal management server, a response to each of the at least one communication request, the response may include status information and configuration information.

In accordance with an exemplary embodiment, the at least one communication request may correspond to a web token that includes header information, a data payload, and signature information.

In accordance with an exemplary embodiment, the header information may include token type information and algorithm details, the data payload may include serial number information, model information, and monitoring data that corresponds to the remote terminal, and the signature information may relate to private key signature information.

In accordance with an exemplary embodiment, the method may further include receiving, via the remote terminal, the generated response; parsing, via the remote terminal, the generated response to identify at least one parameter; configuring the remote terminal based on the identified at least one parameter; and generating, via the remote terminal, at least one successive communication based on a result of the configuring, the at least one successive communication may include terminal monitoring data and terminal error data.

In accordance with an exemplary embodiment, the identified at least one parameter may include at least one from among operating status information, communication interval information, directive information, and key pair expiration information.

In accordance with an exemplary embodiment, the method may further include determining, via the remote terminal, an expiration status for each of the at least one key pair based on the key pair expiration information; regenerating, via the remote terminal, at least one new key pair based on the corresponding expiration status, the at least one new key pair may include a new public key and a new private key that is persisted within the remote terminal; generating, via the remote terminal, at least one new communication request by using the at least one new key pair, the at least one new communication request may include the new public key; and transmitting, via the remote terminal using the application programming interface, the at least one new communication request to the terminal management server.

In accordance with an exemplary embodiment, the method may further include validating via the terminal management server, the at least one new communication request by using the public key in the persistent object storage repository; and automatically updating, via the terminal management server, the persistent object storage repository with the new public key from the at least one new communication request, wherein the persistent object storage repository may be updated upon successful validation.

In accordance with an exemplary embodiment, to register the remote terminal to the terminal database, the method may further include searching, via the terminal management server, the terminal database by using the signature information to identify a status of the remote terminal, the status may include at least one from among a registered status and an unregistered status; validating, via the terminal management server based on the identified status, the at least one communication request by using the public key; and registering, via the terminal management server, the remote terminal to the terminal database upon successful validation.

In accordance with an exemplary embodiment, the method may further include generating, via the terminal management server, at least one initial key pair for each of the plurality of remote terminals; and transmitting, via the terminal management server, the at least one initial key pair to the corresponding remote terminal.

According to an aspect of the present disclosure, a computing device configured to implement an execution of a method for facilitating automated authentication of a plurality of remote terminals is disclosed. The computing device including a processor; a memory; and a communication interface coupled to each of the processor and the memory, wherein the processor may be configured to generate, via a remote terminal, at least one key pair, the at least one key pair may include a public key and a private key that is persisted within the remote terminal; generate, via the remote terminal, at least one communication request by using the at least one key pair, the at least one communication request may include the public key; transmit, via the remote terminal using an application programming interface, the at least one communication request to a terminal management server; register, via the terminal management server, the remote terminal to a terminal database by using information in the at least one communication request; persist, via the terminal management server, the public key from the at least one communication request to a persistent object storage repository; and generate, via the terminal management server, a response to each of the at least one communication request, the response may include status information and configuration information.

In accordance with an exemplary embodiment, the at least one communication request may correspond to a web token that includes header information, a data payload, and signature information.

In accordance with an exemplary embodiment, the header information may include token type information and algorithm details, the data payload may include serial number information, model information, and monitoring data that corresponds to the remote terminal, and the signature information may relate to private key signature information.

In accordance with an exemplary embodiment, the processor may be further configured to receive, via the remote terminal, the generated response; parse, via the remote terminal, the generated response to identify at least one parameter; configure the remote terminal based on the identified at least one parameter; and generate, via the remote terminal, at least one successive communication based on a result of the configuring, the at least one successive communication may include terminal monitoring data and terminal error data.

In accordance with an exemplary embodiment, the identified at least one parameter may include at least one from among operating status information, communication interval information, directive information, and key pair expiration information.

In accordance with an exemplary embodiment, the processor may be further configured to determine, via the remote terminal, an expiration status for each of the at least one key pair based on the key pair expiration information; regenerate, via the remote terminal, at least one new key pair based on the corresponding expiration status, the at least one new key pair may include a new public key and a new private key that is persisted within the remote terminal; generate, via the remote terminal, at least one new communication request by using the at least one new key pair, the at least one new communication request may include the new public key; and transmit, via the remote terminal using the application programming interface, the at least one new communication request to the terminal management server.

In accordance with an exemplary embodiment, the processor may be further configured to validate, via the terminal management server, the at least one new communication request by using the public key in the persistent object storage repository; and automatically update, via the terminal management server, the persistent object storage repository with the new public key from the at least one new communication request, wherein the persistent object storage repository may be updated upon successful validation.

In accordance with an exemplary embodiment, to register the remote terminal to the terminal database, the processor may be further configured to search, via the terminal management server, the terminal database by using the signature information to identify a status of the remote terminal, the status may include at least one from among a registered status and an unregistered status; validate, via the terminal management server based on the identified status, the at least one communication request by using the public key; and register, via the terminal management server, the remote terminal to the terminal database upon successful validation.

In accordance with an exemplary embodiment, the processor may be further configured to generate, via the terminal management server, at least one initial key pair for each of the plurality of remote terminals; and transmit, via the terminal management server, the at least one initial key pair to the corresponding remote terminal.

According to an aspect of the present disclosure, a non-transitory computer readable storage medium storing instructions for facilitating automated authentication of a plurality of remote terminals is disclosed. The storage medium including executable code which, when executed by a processor, may cause the processor to generate, via a remote terminal, at least one key pair, the at least one key pair may include a public key and a private key that is persisted within the remote terminal; generate, via the remote terminal, at least one communication request by using the at least one key pair, the at least one communication request may include the public key; transmit, via the remote terminal using an application programming interface, the at least one communication request to a terminal management server; register, via the terminal management server, the remote terminal to a terminal database by using information in the at least one communication request; persist, via the terminal management server, the public key from the at least one communication request to a persistent object storage repository; and generate, via the terminal management server, a response to each of the at least one communication request, the response may include status information and configuration information.

In accordance with an exemplary embodiment, the at least one communication request may correspond to a web token that includes header information, a data payload, and signature information.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
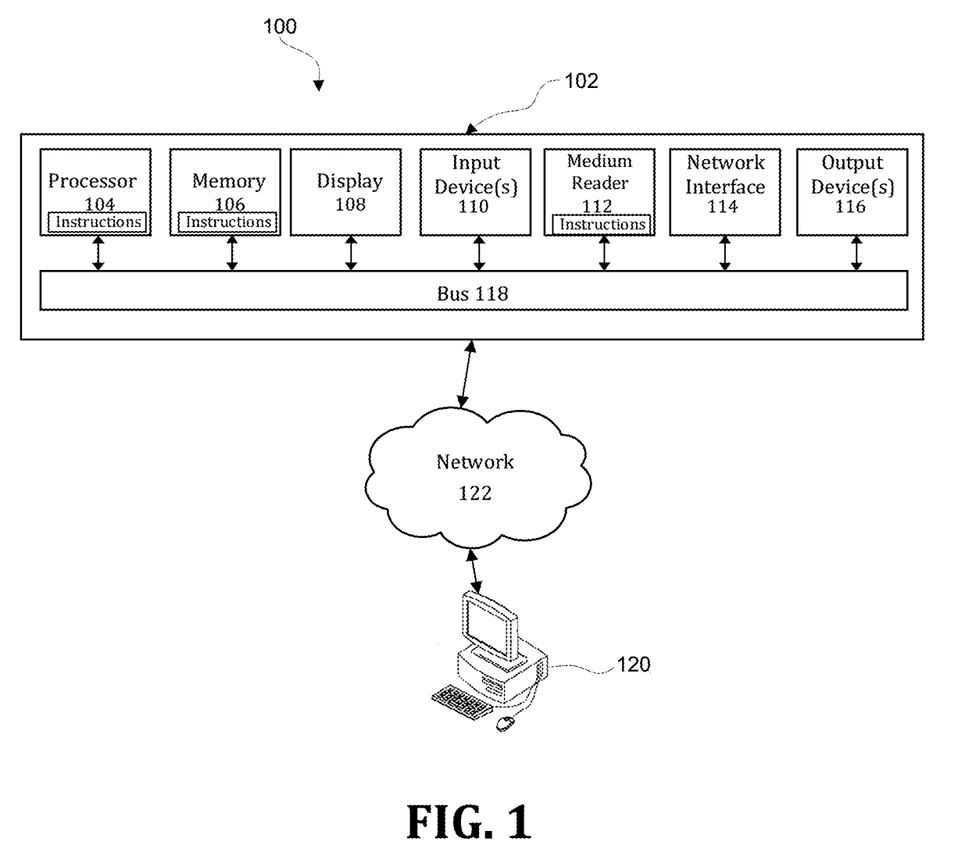
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or subsystems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating automated authentication of electronic communications between remote terminals and terminal management servers.

Figure 2:
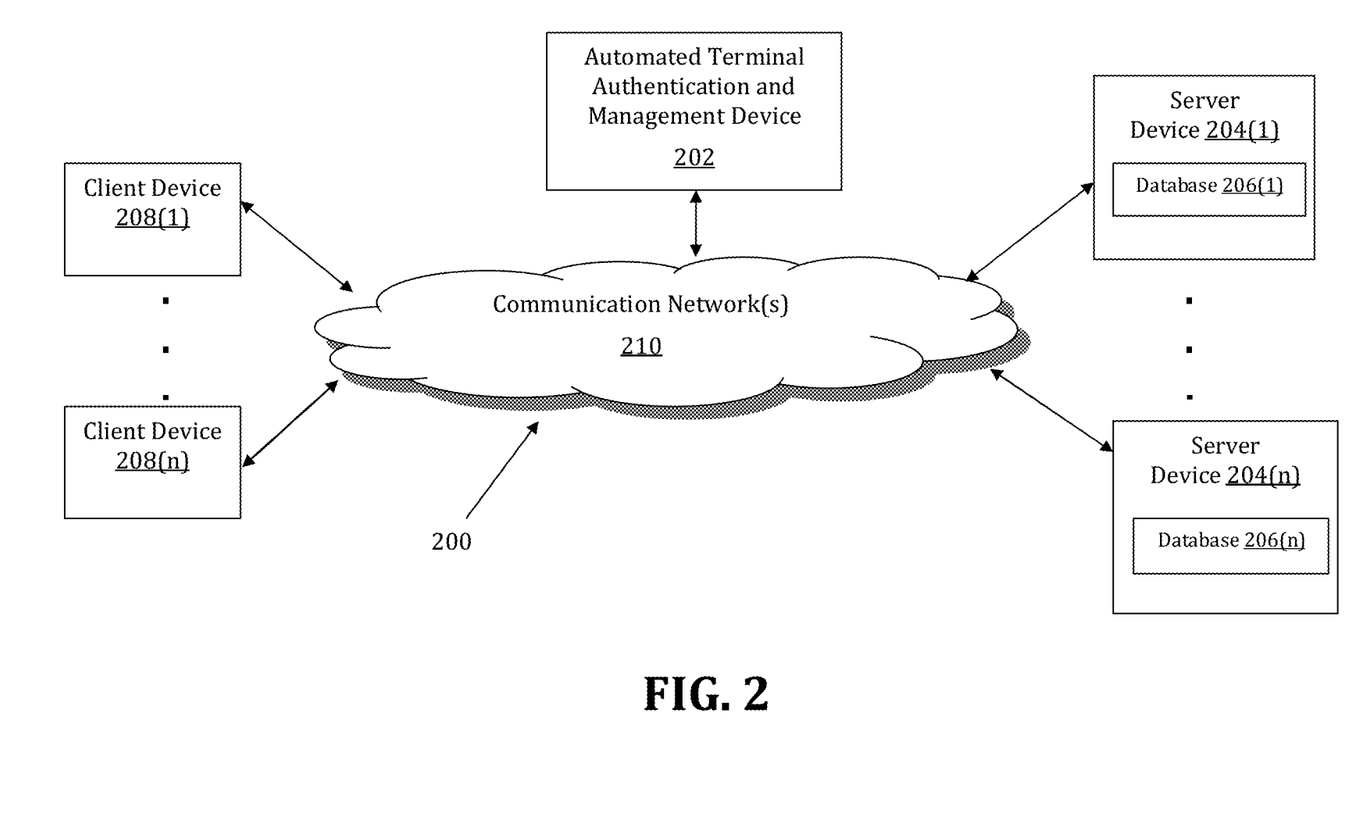
FIG. 2 illustrates an exemplary diagram of a network environment.

Referring to FIG. 2, a schematic of an exemplary network environment 200 for implementing a method for facilitating automated authentication of electronic communications between remote terminals and terminal management servers is illustrated. In an exemplary embodiment, the method is executable on any networked computer platform, such as, for example, a personal computer (PC).

The method for facilitating automated authentication of electronic communications between remote terminals and terminal management servers may be implemented by an Automated Terminal Authentication and Management (ATAM) device 202. The ATAM device 202 may be the same or similar to the computer system 102 as described with respect to FIG. 1. The ATAM device 202 may store one or more applications that can include executable instructions that, when executed by the ATAM device 202, cause the ATAM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ATAM device 202 itself, may be located in virtual server(s) running in a cloud-based computing environment rather than being tied to one or more specific physical network computing devices. Also, the application(s) may be running in one or more virtual machines (VMs) executing on the ATAM device 202. Additionally, in one or more embodiments of this technology, virtual machine(s) running on the ATAM device 202 may be managed or supervised by a hypervisor.

In the network environment 200 of FIG. 2, the ATAM device 202 is coupled to a plurality of server devices 204(1)-204(n) that hosts a plurality of databases 206(1)-206(n), and also to a plurality of client devices 208(1)-208(n) via communication network(s) 210. A communication interface of the ATAM device 202, such as the network interface 114 of the computer system 102 of FIG. 1, operatively couples and communicates between the ATAM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ATAM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ATAM devices that efficiently implement a method for facilitating automated authentication of electronic communications between remote terminals and terminal management servers.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ATAM device 202 may be a standalone device or integrated with one or more other devices or apparatuses, such as one or more of the server devices 204(1)-204(n), for example. In one particular example, the ATAM device 202 may include or be hosted by one of the server devices 204(1)-204(n), and other arrangements are also possible. Moreover, one or more of the devices of the ATAM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ATAM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to key pairs, public keys, private keys, web tokens, communication requests, terminal registration information, responses, status information, and configuration information.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ATAM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ATAM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ATAM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ATAM device 202, the server devices 204(1)-204(n), or the client devices 208(1)-208(n), for example, may be configured to operate as virtual instances on the same physical machine. In other words, one or more of the ATAM device 202, the server devices 204(1)-204(n), or the client devices 208(1)-208(n) may operate on the same physical device rather than as separate devices communicating through communication network(s) 210. Additionally, there may be more or fewer ATAM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
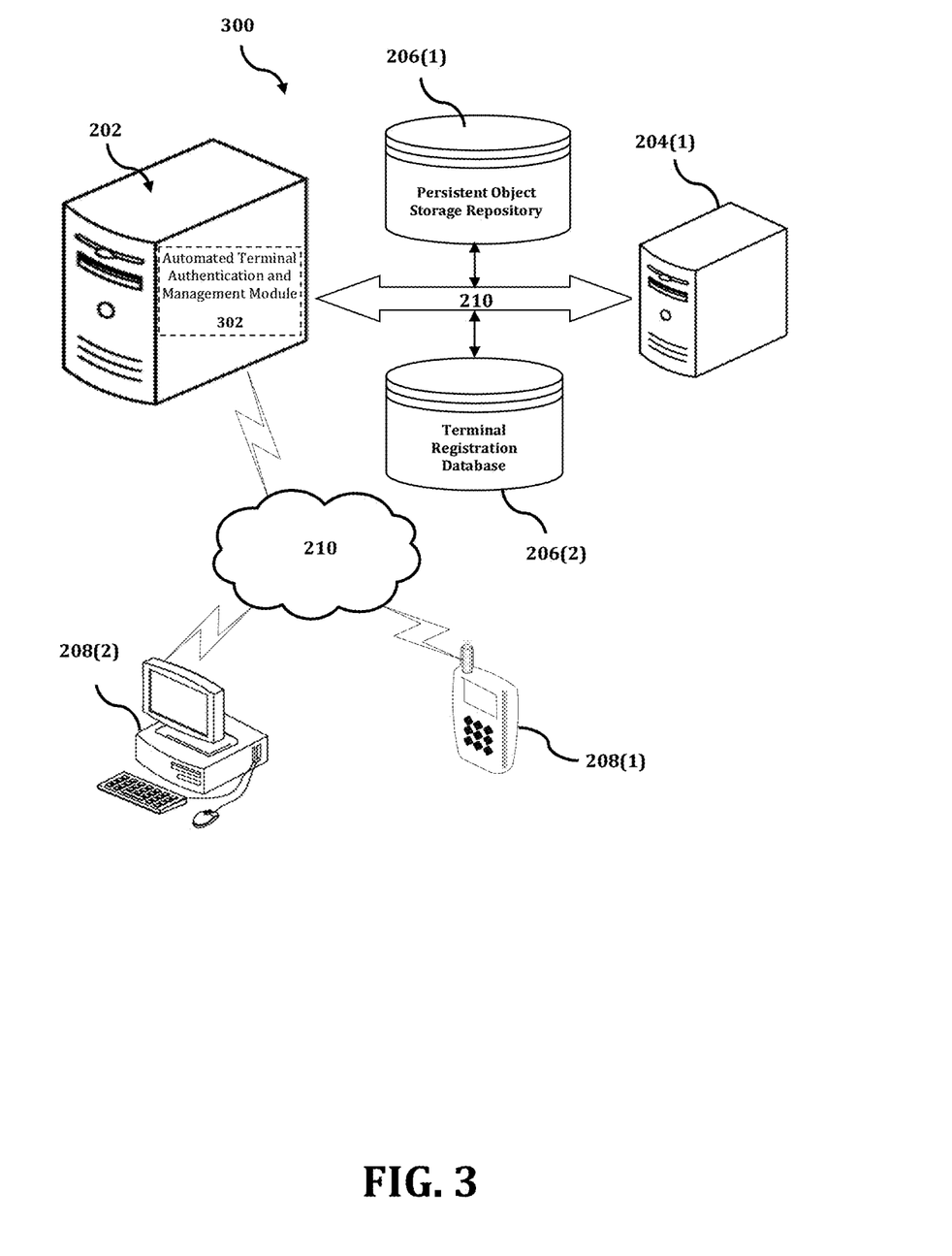
FIG. 3 shows an exemplary system for implementing a method for facilitating automated authentication of electronic communications between remote terminals and terminal management servers.

The ATAM device 202 is described and shown in FIG. 3 as including an automated terminal authentication and management module 302, although it may include other rules, policies, modules, databases, or applications, for example. As will be described below, the automated terminal authentication and management module 302 is configured to implement a method for facilitating automated authentication of electronic communications between remote terminals and terminal management servers.

An exemplary process 300 for implementing a mechanism for facilitating automated authentication of electronic communications between remote terminals and terminal management servers by utilizing the network environment of FIG. 2 is shown as being executed in FIG. 3. Specifically, a first client device 208(1) and a second client device 208(2) are illustrated as being in communication with ATAM device 202. In this regard, the first client device 208(1) and the second client device 208(2) may be "clients" of the ATAM device 202 and are described herein as such. Nevertheless, it is to be known and understood that the first client device 208(1) and/or the second client device 208(2) need not necessarily be "clients" of the ATAM device 202, or any entity described in association therewith herein. Any additional or alternative relationship may exist between either or both of the first client device 208(1) and the second client device 208(2) and the ATAM device 202, or no relationship may exist.

Further, ATAM device 202 is illustrated as being able to access a persistent object storage repository 206(1) and a terminal registration database 206(2). The automated terminal authentication and management module 302 may be configured to access these databases for implementing a method for facilitating automated authentication of electronic communications between remote terminals and terminal management servers.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ATAM device 202 via broadband or cellular communication. Of course, these embodiments are merely exemplary and are not limiting or exhaustive.

Upon being started, the automated terminal authentication and management module 302 executes a process for facilitating automated authentication of electronic communications between remote terminals and terminal management servers. An exemplary process for facilitating automated authentication of electronic communications between remote terminals and terminal management servers is generally indicated at flowchart 400 in FIG. 4.

Figure 4:
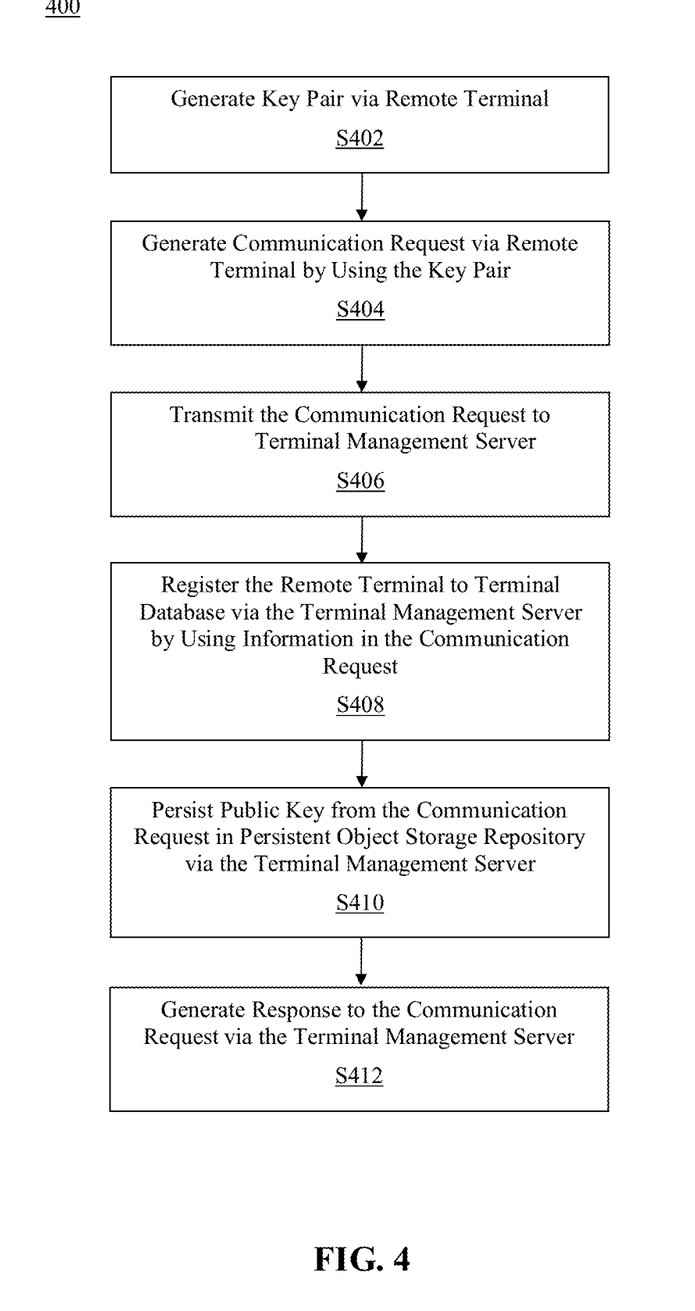
FIG. 4 is a flowchart of an exemplary process for implementing a method for facilitating automated authentication of electronic communications between remote terminals and terminal management servers.

In the process 400 of FIG. 4, at step S402, a key pair may be generated via a remote terminal. The key pair may include a public key and a private key that is persisted within the remote terminal. In an exemplary embodiment, a software agent that is installed in the remote terminal may prepare for an initial automated electronic message by generating the key pair. The software agent may utilize a cryptographic algorithm such as, for example, a public-key cryptosystem to generate keys in a predetermined key size such as, for example, 3072 bit keys and 4096 bit keys. In another exemplary embodiment, the key size may relate to a number of bits in a key that is used by the cryptographic algorithm. The key size may be predetermined based on guidelines such as, for example, operational guidelines and regulatory guidelines.

In another exemplary embodiment, the remote terminal may correspond to a computer terminal that may be used to interact with a computing system such as, for example, an enterprise network. The computer terminal may include an electronic and/or electromechanical hardware device that may be configured to receive inputs, retrieve data, and display the retrieved data to perform various functions. In another exemplary embodiment, the remote terminal may include hardware such as, for example, a point-of-sale terminal that enables merchants to process payments to complete a transaction. The point-of-sale terminals may be a component of an overall point-of-sale system that includes relevant hardware and software consistent with present disclosures. As will be appreciated by a person of ordinary skill in the art, references to the remote terminal may be interpreted to include any combination of a plurality of components of the overall point-of-sale system.

In another exemplary embodiment, generation of the key pair by using cryptographic algorithms may relate to a field of cryptography such as, for example, public-key cryptography and asymmetric cryptography that use pairs of related keys. In public-key cryptography, each key pair may include a public key and a corresponding private key. The key pairs may be generated with cryptographic algorithms based on mathematical problems such as, for example, one-way functions. For example, in a public-key encryption system, anyone with a public key can encrypt a message, yielding a ciphertext, but only those who know the corresponding private key can decrypt the ciphertext to obtain the original message. As will be appreciated by a person of ordinary skill in the art, security of the public-key cryptography system may be enabled by keeping the private key secret and openly distributing the public key.

In another exemplary embodiment, the private key may be securely persisted within the remote terminal. The private key may be further encrypted based on predetermined requirements prior to persistence within a memory device of the remote terminal. In another exemplary embodiment, the private key may be persisted in a dedicated secure subsystem such as, for example, a secure enclave that is integrated into systems on chips (SoCs). The dedicated secure subsystem may be isolated from the main processor to provide additional layers of security. Isolation of the dedicated secure subsystem may keep sensitive data such as, for example, the private key secure even when an application processor kernel becomes compromised. The dedicated secure subsystem may follow similar design principles as SoC design principles such as, for example, a boot read-only memory (ROM) to establish a hardware root of trust, an advanced encryption standard (AES) engine for efficient and secure cryptographic operations, and protected memory.

In another exemplary embodiment, the software agent that is installed in the remote terminal may correspond to a persistent, goal-oriented computer program that reacts to environmental data and executes autonomously without continuous direct supervision to perform a predetermined function. The software agent may relate to an application in the remote terminal that acts on behalf of management systems to monitor and manage the remote terminal.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

In another exemplary embodiment, an initial key pair may be generated by a terminal management server for each of a plurality of remote terminals. The terminal management server may transmit the initial key pair to the corresponding remote terminal to initiate an onboarding process for each of the plurality of remote terminals. For example, the initial key pairs may be generated server side and then provided to the remote terminal. The terminal management server may generate the key pair and perform operations consistent with present disclosures without requiring an initial communication from the remote terminal.

At step S404, a communication request may be generated by using the key pair. The communication request may be generated via the remote terminal and may include the public key. In an exemplary embodiment, the software agent may prepare a communication request such as, for example, a heartbeat call for transmission to a terminal management server. The communication request may correspond to a web token that includes header information, a data payload, and signature information. The header information may include token type information and algorithm details. The data payload may include serial number information, model information, and monitoring data that corresponds to the remote terminal. As the communication request may be signed by the remote terminal using the private key, the signature information may relate a private key signature information.

In another exemplary embodiment, the web token may correspond to an internet standard and/or protocol such as, for example, a JAVASCRIPT Object Notation (JSON) web token for the creation of data with optional signature and/or optional encryption. The payload of the web token may include data in a JSON format that asserts a claims-based identity. In another exemplary embodiment, the JSON web token may relate to an open standard that defines a compact and self-contained process for securely transmitting information between parties as a JSON object. The JSON web token may correspond to a digital envelop that contains all required information about an entity. As such, the JSON web token may avoid querying a database more than once and may not need to call a separate server for token validation.

At step S406, the communication request may be transmitted to a terminal management server. The communication request may be transmitted via the remote terminal by using an application programming interface (API). In an exemplary embodiment, the API may relate to a connection between computer programs. The API may include a type of software interface that offers a service to other pieces of software programs. The API may correspond to a software intermediary that enables communication between two software programs.

At step S408, the remote terminal may be registered to a terminal database by using information in the communication request. The remote terminal may be registered via the terminal management server. In an exemplary embodiment, when the communication request is received by the terminal management server for the first time from the remote server, the terminal management server may look up the remote terminal in the terminal database by using the signature information from the communication request.

When the remote terminal is identified and found to be unregistered, the terminal management server may validate the communication request by using the public key in the data payload of the communication request. Then, the serial number and model information corresponding to the remote terminal may be extracted from the communication request. The serial number and model information may be usable by the terminal management server to register the remote terminal to the terminal database.

In another exemplary embodiment, to register the remote terminal to the terminal database, the terminal management server may search the terminal database by using the signature information. Consistent with present disclosures, the terminal management server may search the terminal database to identify a status of the remote terminal. In another exemplary embodiment, the status may include at least one from among a registered status and an unregistered status. Then, the communication request may be validated via the terminal management server based on the identified status. The communication request may be validated by using the public key. Finally, the remote terminal may be registered to the terminal database by the terminal management server upon successful validation.

At step S410, the public key from the communication request may be persisted to a persistent object storage repository. The public key may be associated with the remote terminal and persisted via the terminal management server. In an exemplary embodiment, the persistent object storage repository may map various objects in an application such as, for example, the software agent and records the mapping in a persistent storage device. The recorded mapping may correspond to an association between the remote terminal and the stored public key.

At step S412, a response may be generated via the terminal management server. The response may be generated for the communication request and may include status information and configuration information. In an exemplary embodiment, the terminal management server may package the response, which includes the status information as well as a communication interval period, directives information, and key expiration time. The terminal management server may then send the packaged response back to the remote terminal for processing.

In another exemplary embodiment, the remote terminal may receive the generated response. The generated response may be parsed by the remote terminal to identify at least one parameter. Consistent with present disclosure, the identified parameter may include at least one from among operating status information, communication interval information, directive information, and key pair expiration information. Then, the remote terminal may be configured based on the identified parameter. For example, the remote terminal may automatically apply settings that have been identified in the response to ensure operating consistency. Finally, a successive communication may be generated based on a result of the configuring. The successive communication may be generated by the remote terminal and may include terminal monitoring data and terminal error data. For example, the successive communication may provide operating metrics of the remote terminal to the terminal management server consistent with the result of the configuring.

In another exemplary embodiment, an expiration status for the key pair may be determined. The remote terminal may determine the expiration status for the key pair based on the key pair expiration information in the response. The expiration status may include at least one from among an expired status and an expiring status. For example, an expiring status may provide a warning that a key refresh may need to be initiated soon. For the expired status, a new key pair may be generated by the remote terminal based on the determined expiration status. The new key pair may include a new public key and a new private key that is persisted within the remote terminal consistent with present disclosures. Then, a new communication request may be generated by the remote terminal using the new key pair. The new communication request may include the new public key.

Finally, the new communication request may be transmitted by the remote terminal to the terminal management server using the API.

In another exemplary embodiment, the terminal management server may receive and validate the new communication request by using the public key in the persistent object storage repository. The persistent object storage repository may be automatically updated by the terminal management server with the new public key from the new communication request. The persistent object storage repository may only be automatically updated upon successful validation of the new communication request.

Accordingly, with this technology, an optimized process for facilitating automated authentication of electronic communications between remote terminals and terminal management servers is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating automated authentication of a plurality of remote terminals, the method being implemented by at least one processor, the method comprising:
   generating, by the at least one processor via a remote terminal, at least one key pair, the at least one key pair including a public key and a private key that is persisted within the remote terminal, wherein the private key is encrypted based on predetermined requirements prior to persistence in the remote terminal, and wherein the private key is persisted in a dedicated secure subsystem that is integrated into systems on chips (SoCs) and isolated from a processor of the remote terminal;
   generating, by the at least one processor via the remote terminal, at least one communication request by using the at least one key pair, the at least one communication request including the public key;
   transmitting, by the at least one processor via the remote terminal using an application programming interface, the at least one communication request to a terminal management server;
   searching, by the at least one processor via the terminal management server, a terminal database to identify a status of the remote terminal based on signature information included in the at least one communication request;
   validating, by the at least one processor via the terminal management server, the at least one communication request by using the public key included in the at least one communication request;
   upon validation of the at least one communication request, extracting serial number and model information of the remote terminal from the at least one communication request;
   registering, by the at least one processor via the terminal management server, the remote terminal to the terminal database by using the serial number and the model information of the remote terminal extracted from the at least one communication request;
   persisting, by the at least one processor via the terminal management server, the public key from the at least one communication request to a persistent object storage repository; and
   generating, by the at least one processor via the terminal management server, a response to each of the at least one communication request, the response including status information and configuration information.

2. The method of claim 1, wherein the at least one communication request corresponds to a web token that includes header information, a data payload, and the signature information.

3. The method of claim 2, wherein the header information includes token type information and algorithm details, wherein the data payload includes the serial number information, the model information, and monitoring data that corresponds to the remote terminal, and wherein the signature information relates to private key signature information.

4. The method of claim 1, further comprising:
   receiving, by the at least one processor via the remote terminal, the generated response;
   parsing, by the at least one processor via the remote terminal, the generated response to identify at least one parameter;
   configuring, by the at least one processor, the remote terminal based on the identified at least one parameter; and
   generating, by the at least one processor via the remote terminal, at least one successive communication based on a result of the configuring, the at least one successive communication including terminal monitoring data and terminal error data.

5. The method of claim 4, wherein the identified at least one parameter includes at least one from among operating status information, communication interval information, directive information, and key pair expiration information.

6. The method of claim 5, further comprising:
determining, by the at least one processor via the remote terminal, an expiration status for each of the at least one key pair based on the key pair expiration information;
regenerating, by the at least one processor via the remote terminal, at least one new key pair based on the corresponding expiration status, the at least one new key pair including a new public key and a new private key that is persisted within the remote terminal;
generating, by the at least one processor via the remote terminal, at least one new communication request by using the at least one new key pair, the at least one new communication request including the new public key; and
transmitting, by the at least one processor via the remote terminal using the application programming interface, the at least one new communication request to the terminal management server.

7. The method of claim 6, further comprising:
validating, by the at least one processor via the terminal management server, the at least one new communication request by using the public key in the persistent object storage repository; and
automatically updating, by the at least one processor via the terminal management server, the persistent object storage repository with the new public key from the at least one new communication request,
wherein the persistent object storage repository is updated upon successful validation.

8. The method of claim 1, further comprising:
generating, by the at least one processor via the terminal management server, at least one initial key pair for each of the plurality of remote terminals; and
transmitting, by the at least one processor via the terminal management server, the at least one initial key pair to the corresponding remote terminal.

9. A computing device configured to implement an execution of a method for facilitating automated authentication of a plurality of remote terminals, the computing device comprising:
a processor;
a memory; and
a communication interface coupled to each of the processor and the memory,
wherein the processor is configured to:
generate, via a remote terminal, at least one key pair, the at least one key pair including a public key and a private key that is persisted within the remote terminal, wherein the private key is encrypted based on predetermined requirements prior to persistence in the remote terminal, and wherein the private key is persisted in a dedicated secure subsystem that is integrated into systems on chips (SoCs) and isolated from a processor of the remote terminal;
generate, via the remote terminal, at least one communication request by using the at least one key pair, the at least one communication request including the public key;
transmit, via the remote terminal using an application programming interface, the at least one communication request to a terminal management server;
search, via the terminal management server, a terminal database to identify a status of the remote terminal based on signature information included in the at least one communication request;
validate, via the terminal management server, the at least one communication request by using the public key included in the at least one communication request;
upon validation of the at least one communication request, extract serial number and model information of the remote terminal from the at least one communication request;
register, via the terminal management server, the remote terminal to the terminal database by using the serial number and the model information of the remote terminal extracted from the at least one communication request;
persist, via the terminal management server, the public key from the at least one communication request to a persistent object storage repository; and
generate, via the terminal management server, a response to each of the at least one communication request, the response including status information and configuration information.

10. The computing device of claim 9, wherein the at least one communication request corresponds to a web token that includes header information, a data payload, and the signature information.

11. The computing device of claim 10, wherein the header information includes token type information and algorithm details, wherein the data payload includes the serial number information, the model information, and monitoring data that corresponds to the remote terminal, and wherein the signature information relates to private key signature information.

12. The computing device of claim 9, wherein the processor is further configured to:
receive, via the remote terminal, the generated response;
parse, via the remote terminal, the generated response to identify at least one parameter;
configure the remote terminal based on the identified at least one parameter; and
generate, via the remote terminal, at least one successive communication based on a result of the configuring, the at least one successive communication including terminal monitoring data and terminal error data.

13. The computing device of claim 12, wherein the identified at least one parameter includes at least one from among operating status information, communication interval information, directive information, and key pair expiration information.

14. The computing device of claim 13, wherein the processor is further configured to:
determine, via the remote terminal, an expiration status for each of the at least one key pair based on the key pair expiration information;
regenerate, via the remote terminal, at least one new key pair based on the corresponding expiration status, the at least one new key pair including a new public key and a new private key that is persisted within the remote terminal;
generate, via the remote terminal, at least one new communication request by using the at least one new key pair, the at least one new communication request including the new public key; and transmit, via the remote terminal using the application programming interface, the at least one new communication request to the terminal management server.

15. The computing device of claim 14, wherein the processor is further configured to:

validate, via the terminal management server, the at least one new communication request by using the public key in the persistent object storage repository; and automatically update, via the terminal management server, the persistent object storage repository with the new public key from the at least one new communication request, wherein the persistent object storage repository is updated upon successful validation.

16. The computing device of claim 9, wherein the processor is further configured to:

generate, via the terminal management server, at least one initial key pair for each of the plurality of remote terminals; and transmit, via the terminal management server, the at least one initial key pair to the corresponding remote terminal.

17. A non-transitory computer readable storage medium storing instructions for facilitating automated authentication of a plurality of remote terminals, the storage medium comprising executable code which, when executed by a processor, causes the processor to:

generate, via a remote terminal, at least one key pair, the at least one key pair including a public key and a private key that is persisted within the remote terminal, wherein the private key is encrypted based on predetermined requirements prior to persistence in the remote terminal, and wherein the private key is persisted in a dedicated secure subsystem that is integrated into systems on chips (SoCs) and isolated from a processor of the remote terminal;

generate, via the remote terminal, at least one communication request by using the at least one key pair, the at least one communication request including the public key;

transmit, via the remote terminal using an application programming interface, the at least one communication request to a terminal management server;

search, via the terminal management server, a terminal database to identify a status of the remote terminal based on signature information included in the at least one communication request;

validate, via the terminal management server, the at least one communication request by using the public key included in the at least one communication request;

upon validation of the at least one communication request, extract serial number and model information of the remote terminal from the at least one communication request;

register, via the terminal management server, the remote terminal to the terminal database by using the serial number and the model information of the remote terminal extracted from the at least one communication request;

persist, via the terminal management server, the public key from the at least one communication request to a persistent object storage repository; and generate, via the terminal management server, a response to each of the at least one communication request, the response including status information and configuration information.

18. The storage medium of claim 17, wherein the at least one communication request corresponds to a web token that includes header information, a data payload, and the signature information.

* * * * *